Oct. 14, 1958
C. L. HECK ET AL
2,856,365
METHOD OF PRODUCING FERRITES
Filed Oct. 12, 1955
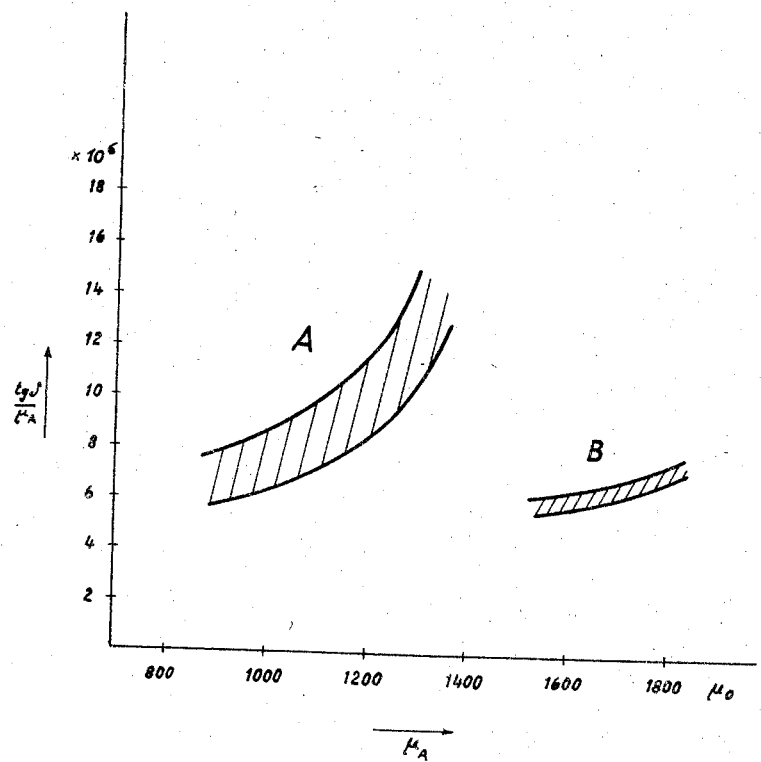
INVENTOR
C. L. HECK - J. F. L. WEBER
BY *R. P. Morris*
ATTORNEY

United States Patent Office 2,856,365
Patented Oct. 14, 1958

2,856,365

METHOD OF PRODUCING FERRITES

Carl L. Heck and Joachim F. L. Weber, Nurnberg, Germany, assignors to International Standard Electric Corporation, New York, N. Y., a corporation of Delaware Application October 12, 1955, Serial No. 540,082

Claims priority, application Germany October 19, 1954

1 Claim. (Cl. 252—62.5)

This invention relates to a method of producing ferrites, and particularly to a method utilizing materials having a larger percentage of impurities than heretofore thought permissible in the production of ferrites.

In recent years considerable work has been done in the production of ferrites and many processes are now well-known to the art. Generally, ferrites are produced by mixing oxides of selected metals, and heating the mixture to a given temperature at which a reaction between the oxides takes place. The mixture is then cooled, ground and pressed into a suitable shape and sintered.

All of the known processes require the use of comparatively pure metal oxides and suggest that satisfactory characteristics may be obtained only when using such pure materials. The purification of oxides is of course expensive and adds materially to the cost of manufacturing.

It is an object of this invention to produce a ferrite having highly satisfactory characteristics and using materials having a comparatively high percentage of impurities. It is to be understood that the expression "comparatively high percentage of impurities" means a percentage of impurities many times that thought permissible by conventional processes. For example, metal oxides having impurities as high as 2% may now be used. In accordance with an aspect of applicants' invention the impurities contained in the materials are eliminated from the final product by a washing process so that although the starting materials contain impurities the final product is comparatively pure.

The above-mentioned and other features and objects of this invention and the manner of attaining them will be best understood by reference to the following description of an embodiment of the invention taken in conjunction with the accompanying drawing, in which the figure is a graph showing the permeabilities and losses of two ferrites; one prepared in accordance with the invention and the other prepared in accordance with known techniques.

By way of example, a manganese-zinc ferrite was produced by mixing the oxides $Fe_2O_3$, $Mn_2O_3$ and $ZnO$ in the molar ratio of approximately 50:25:25. The oxides contained impurities up to slightly more than 2%. The oxides were mixed and ground for approximately 24 hours in a wet state. After the oxides were suitably ground, the powder was dried and placed into suitable molds. The oxides were then annealed in an air atmosphere at a temperature approximately 1050° C. for a period of about 40 minutes.

The mixture, after annealing, is chemically a ferrite. However, the ferrite still contains the impurities which are removed as follows: The ferrite is again ground for a period of approximately 24 hours in a wet state. In accordance with the invention the impurities are removed by washing the ferrite powder with a suitable liquid e. g., distilled water. The distilled water is heated to its boiling point which causes the ferrite powder to become suspended in the liquid. Thereafter, the ferrite powder is removed from the distilled water by any suitable means such as a vacuum filter. The ferrite powder is then washed again until the wash-water shows no sulphate reaction. During the production of a particular manganese-zinc ferrite, the wash-water contained calcium, silicon, sodium and sulfur as the main components, aluminum, molybdenum, mangesium and boron in slight quantities, and traces of strontium, copper, lead, arsenic and barium. The nature of the impurities will, of course, vary according to the manufacturing process and the raw materials from which the oxides were obtained. It is to be realized, however, that the invention is not limited to any specific group of oxides or any specific group of impurities.

It may be desired to add to the wash-water a solution of sodium chloride, ammonium acetate or similar salts which accelerate the washing action.

It is essential for the washing to be effective that the ferrite be ground to a suitable grain size. Therefore, it is essential to produce a certain optimum grain size by the grinding process.

The washed ferrite powder is then further processed in the conventional manner. That is, the powder is dried and pressed into a desired shape. The pressed ferrite is then annealed at a temperature of approximately 1300° C. for a period of approximately one hour. While in the furnace the ferrite is permitted to cool slowly to a temperature of 650° C. and thereafter is quenched in air.

Referring to the drawing, there is shown measures of permeabilities and losses of ferrites manufactured in accordance with the invention as compared with ferrites manufactured excluding the washing step. The area A represents the values obtained by a ferrite manufactured in accordance with a prior art method and area B represents the values obtained by the invented method. The values were measured at 50 kc./s. per second. The values are shown in an area rather than by a line because several ferrites were tested and the deviation is a result of manufacturing tolerances.

While we have described above the principles of our invention in connection with a specific composition, it is to be clearly understood that this description is made only by way of example and not as a limitation to the scope of our invention as set forth in the objects thereof and in the accompanying claims.

What is claimed is:

A process of producing a ferrite having magnetic characteristics, comprising $Fe_2O_3$, $Mn_2O_3$ and $ZnO$ in the molar ratio of approximately 50:25:25, grinding said oxides to produce a given grain size, annealing said ground mixture at a temperature of about 1050° C. to produce a ferrite, grinding said ferrite to produce a given grain size, washing the ferrite powder with boiling distilled water to remove certain undesirable impurities from the ferrite powder, grinding said ferrite powder and annealing said powder at a temperature of approximately 1300° C. for approximately one hour.

References Cited in the file of this patent

UNITED STATES PATENTS

| 1,821,208 | Dahlbery | Sept. 1, 1931 |
| 2,640,813 | Berge | June 2, 1953 |

OTHER REFERENCES

"Introduction to Metallurgy," by Newton, John Wiley & Sons, N. Y., 2nd ed., 1948; page 387.

"Ferromagnetic Spinels for Radio Frequencies," by Harvey et al., RCA Review, September 1950, pages 344 to 346.